Dec. 6, 1949 — M. R. HUTCHISON, JR — 2,490,755
AUTOMATIC TYPE SHUTTER WITH BUILT-IN SYNCHRONIZER
Filed Oct. 12, 1945
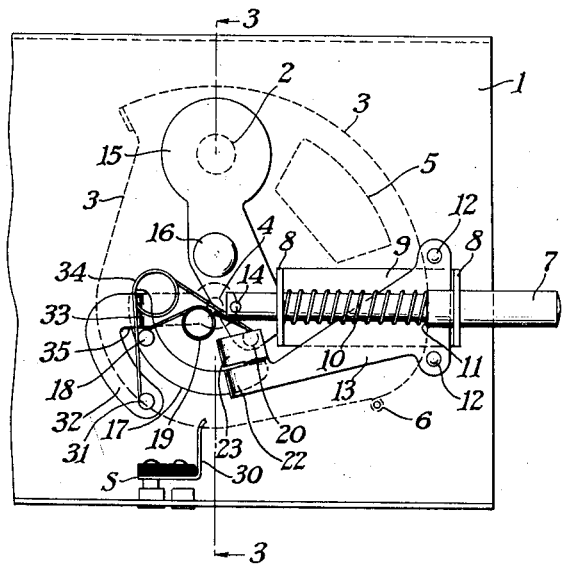
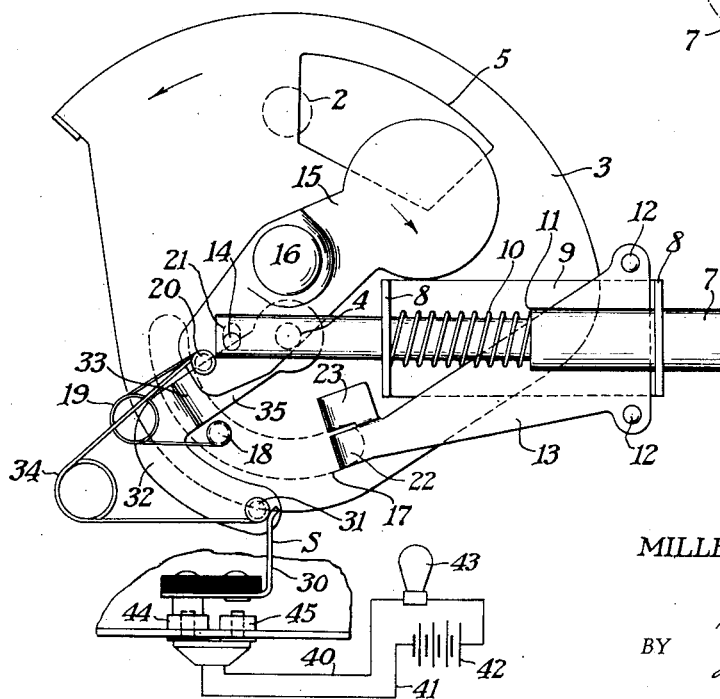
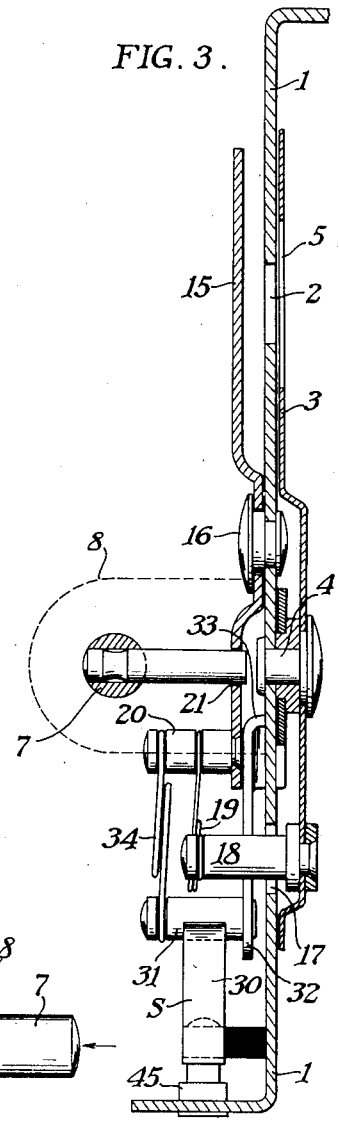
MILLER R. HUTCHISON, JR.
INVENTOR
ATTORNEYS Patented Dec. 6, 1949

2,490,755

UNITED STATES PATENT OFFICE 2,490,755

AUTOMATIC TYPE SHUTTER WITH BUILT-IN SYNCHRONIZER

Miller R. Hutchison, Jr., Rochester, N. Y., assignor to Eastman Kodak Company, Rochester, N. Y., a corporation of New Jersey Application October 12, 1945, Serial No. 622,026

10 Claims. (Cl. 95—11.5)

1

This invention relates to an inexpensive shutter provided with a flash synchronizing switch. One object of my invention is to provide an inexpensive shutter of the type in which a trigger is moved to set and release a shutter blade for making an exposure and to equip such a shutter with a snap switch which will definitely make a circuit in proper timed relation to the operation of the shutter blade. Another object of my invention is to provide a reliable switch which is operable directly from the shutter trigger and which is positively held in an open position until the shutter trigger is operated. Another object of my invention is to provide a synchronizing switch which can be added at extremely small cost to an inexpensive type of shutter, and other objects will appear from the following specification, the novel features being particularly pointed out in the claims at the end thereof.

Inexpensive synchronizing switches have been suggested many times in the prior art but, unfortunately, most of these mechanisms are comparatively expensive to add to shutters because it is usually somewhat difficult to provide a switch which is simple, positive in operation, and which remains constantly in the proper synchronism with the operation of the shutter. It is well known that different types of flash bulbs have different lags after their circuit is made and before the light emitted from the bulb reaches its peak, and it is often difficult, if not impossible, to make a simple type of shutter with which different flash bulbs can be used. For instance, one well-known type of flash bulb requires five milliseconds after making the circuit before the lamp brilliance is at its peak, and another well-known type of flash bulb requires approximately twenty milliseconds. If the shutter blade moves comparatively rapidly, as is the case with most oscillatable shutters, an exposure may be made in $1/30$ to $1/40$ of a second and it is difficult to synchronize the different types of bulbs. I have endeavored to overcome these difficulties by providing a shutter blade with a weak spring and a comparatively long slot through which an exposure is made so that the shutter makes a comparatively long exposure, such as $1/25$ of a second, thus enabling different flash lamps to be successfully synchronized. The faster the exposure, the more narrowly the operator will be confined to certain types of flash bulbs such as the well-known No. 5 G-E type bulb which operates in five milliseconds. If desired, of course the shutter can often be synchronized for flash bulbs utilizing as much as twenty milliseconds before reaching the peak, but in such cases the shutters will not also synchronize with the short duration flash bulbs.

Coming now to the drawings wherein like reference characters denote like parts throughout:

Fig. 1 is a rear elevation of a shutter including a synchronizing switch constructed in accordance with and embodying a preferred form of my invention;

Fig. 2 is an enlarged view similar to Fig. 1 but with the supporting plate removed and with the parts in a position which they assume just as the switch is closed, and Fig. 3 is an enlarged section taken on line 3—3 of Fig. 1.

In the illustrated embodiment of my invention, I have provided a simple type of shutter known generally as an automatic shutter in that a single pressure on a release causes an exposure to be made, and I have added to this shutter a simple type of snap switch which is spring-held in an open position, the spring being tensioned and released by the shutter trigger mechanism to make an exposure.

More specifically referring to Fig. 1, the shutter may consist of a support which, in the present instance, consists of a plate 1 having an exposure aperture 2 therein. This support carries a shutter blade 3 by means of a stud 4, the shutter blade having an exposure slot 5 which makes an exposure when the slot 5 swings across the exposure aperture 2. A pin 6 may define the normal position of rest of the shutter in which position the shutter lies except when an exposure is being made. In order to actuate the shutter blade, I provide a trigger mechanism which, in this instance, consists of a trigger 7, mounted to slide in the ears 8 of a bracket 9. A spring 10 lying against one ear 8 and a shoulder 11 on the trigger normally holds the trigger in the position shown in Fig. 1. The bracket 8 may be attached as by screws or rivets 12 to the support 1, these screws or rivets also holding a rebound spring 13 in place.

The trigger mechanism also includes a pin 14 in the end of the trigger engaging a cover blind 15 which may turn upon the stud 16 from the position shown in Fig. 1 to that shown in Fig. 2 in making an exposure.

The supporting plate 1 is provided with an arcuate slot 17 through which a pin 18 extends rearwardly from the shutter blade 3, this pin supporting one end of a hair-pin spring 19, the other end of which is supported by a pin 20 carried by the shutter trigger mechanism structure; in this instance carried by the cover blade 15. Obviously, if desired, the hair-pin spring 19 could encircle the pin 14 carried directly by the trigger. The pin 14 engages a slot 21 in the cover blind 15 so that these two parts move as a unit. The spring 19 is a comparatively weak one because I prefer to have the shutter blade 3 move comparatively slowly across the exposure aperture 2. When the pin 18 reaches the end of its movement through the slot 17, shown diagrammatically in Fig. 2, it is held against rebound by the spring end 22 of the spring 13 which presses the end of the pin downwardly with respect to Fig. 2. However, when the pin 20 moves to its rest position shown in Fig. 1, it passes under the turned-up end 23 of the spring latch 13 raising this latch so that the pin 18 is released permitting the spring 19 to return the shutter blade 3 to its rest or Fig. 1 position, this movement occurring, of course, after the aperture 2 has been covered by the cover blind 15. The spring 10 of the shutter trigger mechanism is much stronger than the spring 19 and can readily operate it.

As thus far described, the shutter may be similar to the shutter shown in my copending application Serial No. 622,028 for Blade and cover blind shutter, filed October 12, 1945, now Patent No. 2,423,706, granted July 8, 1947. Reference may also be had to my Patent 2,422,018, granted June 10, 1947, for additional details of the shutter on which the contacts of the present invention have been added.

To this shutter I have added a simple type of synchronizing switch. This switch, designated broadly as S, consists of a relatively fixed contact 30 and a relatively movable contact 31 which may be in the form of a pin carried by an L-shaped lever 32 which is pivoted upon the stud 4 carrying the shutter blade 3. This lever is formed downwardly at 33 so as to pass through the arcuate slot 17. A hair-pin spring 34, heavier than hair-pin spring 19, has one end attached to the pin 31 and the other end attached to the pin 20 of the shutter trigger mechanism. Spring 34 therefore normally holds the contacts 30 and 31 open as shown in Fig. 1 where the shutter parts are in their normal position of rest. However, when the shutter trigger 7 is depressed, movement of the pin 20 tensions and releases the hair-pin spring 34 causing the arm 32 to snap into its switch-closing position shown in Fig. 2, so that a circuit may be completed through the wires 40 and 41, thereby permitting a battery 42 to energize the flash lamp 43. It is understood that this lamp and battery circuit can preferably be attached to the shutter shown in Fig. 1 by means of a plug-and-socket connection, the contact members 44 and 45 being diagrammatically illustrated in Fig. 2.

Merely connecting the hair-pin spring 34 with the trigger mechanism pin 20 would not necessarily synchronize the switch with the operation of the shutter blade 3 because the operation of the spring 34 and the spring 19 might not reliably operate their respective parts in their exact timed relation. I have therefore arranged these two springs so that one is angularly offset with respect to the other as shown in Fig. 1 in such a manner that the heavier spring 34 is tensioned and released by the shutter trigger mechanism in advance of the lighter spring 19. Thus, when the shutter trigger is pressed, springs 34 and 19 are both simultaneously tensioned but spring 34 is released either just as the spring 19 is fully tensioned and released, or as the spring 19 is fully tensioned. This causes the edge 35 of the lever arm 32 to engage the pin 18, moving the pin, because of the superior power of spring 34, a short distance or until the switch contacts 30—31 make the circuit. Fig. 2 illustrates this position which is just as the slot 5 in the shutter blade starts to open the exposure aperture 2. From this point onward the spring 19 moves the shutter plate 3 alone so that the shutter may move comparatively slowly. This construction has a number of advantages. First, it permits comparatively slow movement of the shutter blade 3 which is desirable but which is usually avoided because it is unsafe to rely on an extremely light spring as the sole means for starting movement of the shutter blade and, second, the engagement of the lever 32 with the pin 18 definitely synchronizes the movement of the shutter blade with the closing of the synchronizer switch. The combined strengths of the springs 19 and 34 are very much less than that of the spring 10 of the trigger and, consequently, as soon as the trigger 7 is released the spring 10 moves both springs 19 and 34 into a position to tension and release these springs so that the parts may be restored to their Fig. 1 position. However, the movement of the switch arm 32 and the movement of the shutter blade 3 are not simultaneous because the rebound spring 13 frictionally engages the top of the pin 18 and generally holds this pin until the pin 20 of the shutter trigger mechanism passes under the turned-up spring arm 23 releasing the pin 18 from the spring latch. Thus, the cover blind 15 normally returns almost to its initial position of rest before the shutter spring 19 is released by the spring latch 13 to return the shutter blade 3 to its position of rest.

In the present embodiment of my invention, I have shown a shutter trigger 7 which is slidably mounted on the support 1 because many people prefer a trigger which is merely depressed and moved axially in an exposure-making direction to actuate a shutter. However, it is a simple matter to provide a pivoted trigger if an arcuate movement of the shutter release is required.

The operation of my improved form of shutter and synchronizing switch is extremely simple and, in fact, is exactly like the operation of a shutter which may not include such a switch. To make an exposure, the trigger 7 is depressed inwardly in the direction shown by the arrow in Fig. 2. The first part of this movement rocks the cover blind 15 about its pivot 16 through the interengaging pin and slot 14 and 21. This moves the cover blind in the direction shown by the arrow in Fig. 2 away from the exposure aperture 2. During this movement the spring 10 is placed under tension and the springs 19 and 34 are tensioned as the pin 20 moves through its path. This path is such that the pin 20 will pass between the pivot 4 of the shutter blade and of the switch arm 32 and the connections of these springs with these parts. Spring 19 is, of course, connected to the shutter by the pin 18 and spring 34 is connected to the switch arm 32 by the pin 31. Spring 34 may be released slightly before the spring 19 but only after the spring 19 has been tensioned. Consequently, the edge 35 of the lever 32 engages pin 18 and moves it, thereby assisting in the starting movement and as soon as the switch contacts snap to a closed position to make the circuit as shown in Fig. 2, pin 18 continues onwardly under the action of spring 19 until pin 18 is caught by the rebound latch 13. In this position the trigger 7 is fully depressed and upon release of the trigger the spring 10 in restoring the trigger to its Fig. 1 position reverses this process in that the trigger mechanism moves the pin 20 in a reverse direction so that the springs 19 and 34 are again tensioned and when released will restore the parts to their Fig. 1 position. Of course, all this movement takes place with extreme rapidity in comparison with a description of it and the parts can be easily and smoothly operated.

While I have described a preferred embodiment of my synchronizing snap switch, it is understood that various other forms of switches which are spring-held open and which are arranged to be operated by a trigger so that they may snap to a closed position through the operation of the trigger, can be readily devised without departing from the scope of my invention as defined in the following claims.

I claim:

1. A built in photoflash synchronizer for camera shutters which includes a shutter mechanism comprising a shutter blade, a pivotal mount therefor, an apertured support carrying the pivotal mount and shutter blade, a trigger mechanism movably carried by the support, and movable from a rest position in an exposure making direction, a spring attached to the shutter and to the trigger for moving the shutter by tensioning and releasing the spring through movement of the trigger in an exposure making direction, and a switch carried by the support and including a pair of contacts, a movable mount for one of said contacts comprising a pivoted arm, a spring connected to the trigger and to the pivoted arm with both ends of the spring lying to one side of the pivot supporting the arm and one end of the spring lying between and to one side of a line drawn between the other end of the spring and the pivot supporting the arm for normally holding the switch open, said spring snapping the switch closed after limited movement of the trigger in an exposure making direction in which said limited movement may move one end of the spring across said line between the other end of the spring and the pivot supporting the arm, means operable by the trigger and including the pivoted arm and the shutter blade for synchronizing movement of the pivoted arm carrying the movable contact with the exposure-making movement of the shutter blade, and means for connecting the switch into a photoflash circuit.

2. A built in photoflash synchronizer for camera shutters as defined in claim 1 characterized by a spring for returning the trigger mechanism to its rest position, said spring also tensioning and releasing the switch spring to move to switch arm to an open position.

3. A built in flash synchronizer for camera shutters as defined in claim 1 characterized by the spring connecting the pivoted arm for normally holding the switch open being a hairpin spring.

4. A built in flash synchronizer for camera shutters as defined in claim 1 characterized by the spring connecting the pivoted arm for normally holding the switch open being a hairpin spring, and a trigger spring materially stronger than the hairpin spring, for restoring the switch to its normal open position by tensioning and releasing the hair pin spring as the trigger is moved to a normal position of rest.

5. A built in photoflash synchronizer for camera shutters which includes a shutter mechanism comprising a shutter blade, a pivotal mount therefor, an apertured support carrying the pivotal mount and shutter blade, a trigger mechanism movably carried by the support, and movable from a rest position in an exposure making direction, a spring attached to the shutter and to the trigger for moving the shutter by tensioning and releasing the spring through movement of the trigger in an exposure making direction, and a switch carried by the support comprising a relatively fixed contact and a swingable arm carrying a relatively movable contact, a switch spring connecting the movable contact and the trigger for normally holding the switch contacts open, and means operable by the trigger and including the switch spring for synchronizing the switch arm with movement of the shutter blade.

6. A built in photoflash synchronizer for camera shutters as defined in claim 5 characterized by the means for synchronizing the movable switch arm and the shutter blade including a pin on the shutter blade lying in the path of the swingable arm contact and movable therewith.

7. A built in photoflash synchronizer for camera shutters as defined in claim 5 characterized by the means for synchronizing the movable switch arm and the shutter blade including a pin on the shutter blade lying in the path of the swingable arm contact and movable therewith until said switch arm comes to rest against said relatively fixed contact.

8. A built-in flash synchronizer for camera shutters, comprising a support having an exposure aperture therein, two pivotally-mounted plates each adapted to cover and uncover the exposure aperture, one constituting a cover blind and the other constituting a shutter blade, a trigger movable upon the support to and from a rest position, a pin carried by the trigger, a pin carried by the cover blind and a pin carried by the shutter blade, a spring connected to the shutter blade pin and to the cover blind pin, one end of the spring lying to one side of a line drawn between the other end of said spring and the pivot of the cover blind, said spring being set through movement of the trigger and the cover blind and being released thereby when the end of the spring crosses between the other end of the spring and the cover blind pivot, connections between the cover blind and the pin carried by the trigger, a stop for the cover blind, an electric photoflash bulb circuit, a switch in said circuit including a switch arm, a pivotal support therefor, said switch arm having a path of movement on the pivotal support the pin on the shutter blade normally lying in the path of movement of the switch arm, a spring, one end of said spring being connected to the arm, the other end of said spring being connected to the cover blind and normally lying to one side of a line drawn between the first-mentioned spring end and the pivotal support for the switch arm, said switch arm being adapted to be closed by the cover blind moving away from its stop, thereby tensioning and releasing said spring as one end thereof passes between the other end of the spring and the shutter arm pivot, said switch arm engaging and moving the shutter blade through the pin, said shutter blade making an exposure in timed relation to the switch arm closing the switch by uncovering and covering the exposure aperture after the cover blind has moved the shutter blade and released the shutter blade spring.

9. A built-in flash synchronizer for camera shutters, comprising in combination a support having an exposure aperture therein, two pivotally-mounted plates each adapted to cover and uncover the exposure aperture, one constituting a cover blind and the other constituting a shutter blade, a trigger movable upon the support to and from a rest position, a pin carried by the trigger, a pin carried by the cover blind and a pin carried by the shutter blade, the pin carried by the trigger being adapted to move the cover blind, two springs, one spring connected to the shutter pin and to the cover blind pin, a pivoted switch arm carrying a pin and having a path of movement, the pin on the shutter blade lying in said path of movement, the other spring being connected to the cover blind pin and to the switch arm pin, the inner ends of both springs being placed under tension by moving the trigger from its rest position, said movement tensioning and releasing the cover blind spring by moving the inner end of said spring past a dead center between the cover blind pivot and the other end of said spring whereby said switch arm may move, moving the shutter blade through its pin, said switch arm being adapted to close through movement of the cover blind moving to set and release the spring for closing the switch arm, said spring connected to the cover blind and to the shutter blade being operated in timed relation to the closing of said switch.

10. A built-in flash synchronizer for camera shutters, comprising in combination a support having an exposure aperture therein, two pivotally-mounted plates each adapted to cover and uncover the exposure aperture, one constituting a cover blind and the other constituting a shutter blade, a trigger movable upon the support to and from a rest position, a pin carried by the trigger, a pin carried by the cover blind and a pin carried by the shutter blade, the pin carried by the trigger being adapted to move the cover blind, two springs, one spring connected to the shutter pin and to the cover blind pin, a pivoted switch arm carrying a pin and having a path of movement, the pin on the shutter blade lying in the path of movement of the switch arm to be moved thereby, the other spring being connected to the cover blind pin and to the switch arm pin, the inner ends of both springs being placed under tension by moving the trigger from its rest position, said movement tensioning and releasing the cover blind spring by moving the inner end of said spring past a dead center between the cover blind pivot and the other end of said spring, said switch arm being adapted first to move the shutter blade through its pin and then to close through movement of the cover blind moving to set and release the spring for closing the switch arm, said spring connected to the cover blind and to the shutter blade being operated in timed relation to the closing of said switch, and a spring acting on said trigger to move said trigger to a normal position of rest, thereby returning the cover blind to a normal position covering the exposure aperture in the support, simultaneously tensioning and releasing both of said operating springs.

MILLER R. HUTCHISON, JR.

REFERENCES CITED

The following references are of record in the file of this patent:

UNITED STATES PATENTS

| Number | Name | Date |
|---|---|---|
| 2,196,604 | Galter | Apr. 9, 1940 |
| 2,198,975 | Pollock | Apr. 30, 1940 |
| 2,278,173 | Goering | Mar. 31, 1942 |